United States Patent
Dietrich et al.

(10) Patent No.: US 7,118,369 B2
(45) Date of Patent: Oct. 10, 2006

(54) CORRUGATED PIPE PLANT

(75) Inventors: Karl Dietrich, Rain/Lech (DE); Michael Hurler, Rögling (DE)

(73) Assignee: Drossbach GmbH & Co. KG, Rain am Lech (DE)

( * ) Notice: Subject to any disclaimer, the term of this patent is extended or adjusted under 35 U.S.C. 154(b) by 139 days.

(21) Appl. No.: 10/103,164

(22) Filed: Mar. 20, 2002

(65) Prior Publication Data

US 2002/0136791 A1    Sep. 26, 2002

(30) Foreign Application Priority Data

Mar. 21, 2001    (DE) .............................. 201 04 922

(51) Int. Cl.
B29C 53/30    (2006.01)

(52) U.S. Cl. ...................... 425/234; 425/336; 425/369; 425/396

(58) Field of Classification Search ............... 425/233, 425/234, 325, 326.1, 335, 336, 369, 396
See application file for complete search history.

(56) References Cited

U.S. PATENT DOCUMENTS

| | | | |
|---|---|---|---|
| 4,492,551 A * | 1/1985 | Hegler et al. ............... | 425/144 |
| 4,787,598 A * | 11/1988 | Rahn et al. ................. | 249/162 |
| 5,510,071 A * | 4/1996 | Van Wonderen et al. ... | 264/166 |
| 5,522,718 A * | 6/1996 | Dietrich ...................... | 425/325 |
| 5,531,583 A * | 7/1996 | Berns et al. ................. | 425/193 |
| 5,560,941 A * | 10/1996 | Hegler et al. ............... | 425/185 |
| 5,693,347 A * | 12/1997 | Hegler ........................ | 425/233 |
| 5,744,091 A * | 4/1998 | Lupke ......................... | 264/508 |
| 5,773,044 A * | 6/1998 | Dietrich et al. ............. | 425/370 |

(Continued)

FOREIGN PATENT DOCUMENTS

CA    2128774    1/1995

(Continued)

*Primary Examiner*—Duane Smith
*Assistant Examiner*—Emmanuel S. Luk
(74) *Attorney, Agent, or Firm*—Dilworth & Barrese LLP (57) ABSTRACT

The present invention relates to an apparatus for the manufacture of corrugated pipes from thermoplastic in which mould segment halves, which complement one another in pairs, are guided together in a circuit along a mould path adjacent to an injection head, are moved apart at the end of the mould path and are returned back to its start separately from one another. The apparatus has a mould path device to move the mould segment halves along the mould path and a return conveyor to return the mould segment halves from the end of the mould path back to its start, with the mould path device comprising a machine table having a lower guide and lower drive means for the mould segment halves and a cover frame secured to the machine table having an upper guide and upper drive means for the mould segment halves. The mould path device and the return conveyor form units separated from one another, with a portal robot fixedly anchored to a base plate being provided as the return conveyor and the mould path unit being a mobile unit travellable on the base plate. The upper drive means at the cover frame have driving pinions which can be driven around a vertical axis and which can engage into racks at the upper side of the mould segment halves such that a vertical offset is possible, for example as a consequence of thermal expansion, between the mould segment halves and the driving pinions. Furthermore, a direct cooling system is provided for the better dissipation of heat from the mould segment halves which circulates coolant through coolant passages in the mould segment halves during the movement of the mould segment halves along the mould path.

7 Claims, 4 Drawing Sheets

U.S. PATENT DOCUMENTS

2002/0113339 A1 * 8/2002 Starita .................. 264/286

FOREIGN PATENT DOCUMENTS

| | | |
|---|---|---|
| CA | 2185941 | 3/1997 |
| DE | 4338990 | 2/1995 |
| EP | 0764516 | 3/1997 |

* cited by examiner

CORRUGATED PIPE PLANT

BACKGROUND OF THE INVENTION

The present invention relates to an apparatus for the manufacture of corrugated pipes from thermoplastic in which mould segment halves, which complement one another in pairs, are guided together in a circuit along a mould path adjacent to an injection head, are moved apart at the end of the mould path and are returned back to its start separately from one another, comprising a mould path device to move the mould segment halves along the mould path and a return conveyor to convey the mould segment halves from the end of the mould path back to its start, with the mould path device comprising a machine table having a lower guide and lower drive means for the mould segment halves and a cover frame secured to the machine table having an upper guide and upper drive means for the mould segment halves.

With such corrugated pipe plants of the so-called shuttle type, return conveyors moving to and fro are used. The return conveyors can have a gripping arm which grips a mould segment half located at the end of the mould path, travels to the start of the mould path, sets the mould segment half down there and again travels back to the end of the mould path in order to grip the next mould segment half again. On the actual mould path, the mould segment halves are moved along by separate drives which are disposed on the machine table, on the one hand, and at the cover frame disposed thereabove, on the other hand. It is in particular known in this connection to provide driving pinions in the machine table and the cover frame disposed thereabove which engage in racks disposed at the top and at the bottom at the mould segment halves and which move these forward correspondingly.

A corrugated pipe plant of the shuttle type is known from EP 0 764 516 A2. In this, a gantry crane is anchored on a base plate on which the mould path is disposed or the mould segment halves are displaced along the mould path. Carriages which can travel in opposite directions are mounted at a conveying bridge which engages over the mould path device, is formed in a slightly V-like shape and lowers towards the centre, said carriages being secured at gripping arms for the mould segment halves. When the carriages on the V-shaped conveyor bridge are moved apart, the mould segment halves are moved apart transversely to the mould path and thereby simultaneously raised. This known plant, however, has disadvantages in a number of respects. On the one hand, the plant is not very variable. Without fairly large conversion work, it is fixed to one mould segment half size, with which the gantry crane is coordinated with its gripping arms with respect to height and to which the mould path device as such is matched with its upper and lower toothed profile drives. On the other hand, use at different production locations can only be achieved with a large assembly effort for the taking down and setting up of the plant. Moreover, the plant is specifically disadvantageous with respect to the main drive for the mould segment halves along the mould path. The arrangement of the driving pinions and racks at the machine table and at the cover frame or at the lower side and the upper side of the mould segment halves is prone to error with respect to tolerances which can arise, for example, due to thermal expansion of the mould segment halves.

A corrugated pipe plant is furthermore known from WO 94 076 73 in which the mould segment half pairs are combined in two groups. A first group is mounted on a carriage which can be travelled to and fro on a lower support frame. A second group of mould jaws is mounted on a carriage which can be travelled to and fro on an upper carrier frame. The mould segment halves can in this connection each be travelled apart and together on the carriage. To move the mould segment halves back, they are first travelled apart on the carriage, then the carriage with the mould segment halves which are travelled apart is travelled past the mould segment halves of the other carriage back to the start of the mould path and, finally, the mould segment halves on the carriage are again travelled together. This apparatus is, however, less suitable in practice since a plurality of mould segment halves always has to be travelled apart at one time so that de facto only a very short mould path is available.

SUMMARY OF THE INVENTION

The present invention has the underlying object of providing an improved corrugated pipe plant of the kind first mentioned which avoids disadvantages of the prior art and further develops the latter in an advantageous manner. In particular, the conveying of the mould segment halves is to be improved, and indeed both with respect to the conveying by the return conveyor and with respect to the conveying by the main drive in the region of the mould path.

This object is solved in accordance with the invention by an apparatus as disclosed herein. Preferred aspects are also disclosed herein.

It is therefore provided that the mould path device and the return conveyor form units separate from one another, with a portal robot anchored at a base plate being provided as the return conveyor and the mould path unit being a unit which can be travelled on the base plate. In contrast to the prior art, the return conveyor formed as a portal robot and the mould path device do not form a common unit with the machine table and the main drives. Considerable advantages surprisingly result when the mould path device forms an independent mobile unit with the machine table, the guide for the mould segment halves and the main drive for the mould segment halves, which can be travelled out of the portal robot. For example, this makes it possible to transport the expensive mould path device to different operation sites in order to produce full stocks there. The transport, assembly and dismantling are considerably simplified.

In particular a portal robot known per se can be used as the return conveyor. The portal robot can preferably have a planar portal which is mounted on mutually opposite elongate rails, is driven on these, extends transversely over the mould path and can be travelled parallel thereto. A pair of carriages can be mounted at the portal and can be travelled on this in opposite directions to one another. Expediently, a gripping arm is attached to each of the carriages and the mould segment halves to be conveyed back can be gripped with this.

Each gripping arm is preferably vertically adjustable by means of a stroke drive relative to the portal or to the carriage mounted thereon such that the gripped mould segment halves can be raised in an essentially perpendicular manner from the machine table. In contrast to the prior art, it is not the carriage which must be travelled to the outside for the raising, but rather the mould segment half can be raised independently of the other movement axes of the portal robot. This allows mould segment halves of different heights to be gripped without problem. The mould segment halves can therefore advantageously be gripped at their upper side essentially at an axis going through the centre of gravity of the respective mould segment half so that no torque or tilting moment act on the gripping arm and the carriage disposed thereabove.

In a further development of the invention, an electronic coupling is provided between the return conveyor designed as a portal robot and the mould path device, the electronic coupling taking into account the respective position of the mobile mould path device relative to the portal robot. Preferably, a position detection device is provided for the detection of the relative position of the machine table and the return conveyor and a central control unit connected to the position detection device is provided which controls the mould path device and the return conveyor in dependence on the detected orientation to one another. This electronic coupling replaces a mechanical coupling of the return conveyor and the machine table.

The mould path device can preferably be travelled along a pre-set axis, in particular along rails let into the base plate. The position detection device can accordingly be formed with one axis. Preferably, absolute value transponders are provided which, on the one hand, give the position of the machine table and structures secured thereto and, on the other hand, give the position of the portal which can be travelled parallel to the machine table. In addition, an absolute value transponder can be provided to detect the location or position of the main drive of the mould segment halves on the machine table. The absolute value transponders have the advantage that the correct position data can always be available even after a power failure and no new calibration is required.

In order to make the mould path device more easily transportable, it can be provided that the cover frame disposed above the machine table with the upper guide and the upper drive means for the mould segment halves can be lowered towards the machine table into a transport position. In this way, the height of the structures located above the machine table is considerably reduced. The cover frame is preferably mounted on four columns which are secured to the machine table and which can be telescoped in motor driven manner and which can in particular be lowered into the said transport position.

In order to facilitate the matching of the mould path device to differently sized mould segment halves and to in particular make it possible that differently sized mould segment halves can be used, the cover frame can be vertically adjustable relative to the machine table independently of the said lowerability into the transport position together with the guides and drives mounted thereon. For this purpose, actuators can be provided which are separate from the said stroke drive for the lowering into the transport position. The cover frame is preferably vertically adjustable together with the drives and guides mounted thereon via threaded spindles provided at the columns, in particular displaceably mounted at the columns. The columns can be connected to one another via a yoke arranged above the cover frame. The said yoke can be lowered into the said transport position together with the columns and the cover frame.

In accordance with a further advantageous aspect of the present invention, it is provided that the upper drive means mounted on the cover frame are formed such that they allow a displacement of the mould segment halves perpendicular to the machine table. It is achieved in this way that, in operation, a thermal expansion of the mould segment halves is compensated in the direction perpendicular to the machine table. In contrast to the prior art, the mould segment halves are not urged or matched between the driving pinions of the lower drive means arranged in the machine table and the upper drive means mounted on the cover frame. Generally, it could be provided to compensate for the thermal expansion that the upper driving pinions are disposed in a vertically adjustable manner. It is, however, in particular provided that the upper driving pinions run around vertical axes perpendicular to the machine table and the upper racks provided at the mould segment halves are arranged in an accordingly vertical manner such that the racks at the mould segment half can be displaced in a vertical direction relative to the driving pinions. The engagement between the driving pinion and the rack is not changed in this connection, a jolt-free and precise driving is ensured.

To bring the mould segment halves, which are reinserted at the start of the mould path, into exact fitting engagement with the driving pinions and in particular to ensure that the mould segment halves are opened with an exact fitting to the preceding mould segment halves, a separate auxiliary drive is advantageously provided at the machine table. The said auxiliary drive takes over the mould segment halves when these are set down by the portal robot at the machine table at the front end of the mould path and pushes them in the feed direction at a higher speed than the preceding mould segment halves. In a further development of the invention, the insertion means provided at the start of the mould path comprise a damping device which damps the impact on the catching up of the returned mould segment halves with the preceding mould segment halves. It is particularly advantageous if the insertion means are formed by a plurality of pneumatic cylinders whose piston rods press the mould segment halves towards the preceding mould segment halves. The pneumatic cylinders already have an integrated damping due to the used pressure means of air. In this way, a gentle catching up of the returned mould segment halves can be achieved.

In accordance with a further advantageous aspect of the present invention, a direct cooling of the mould segment halves is provided. Heat from the extruded plastic pipe which flows off into the mould segment halves is dissipated more efficiently and thermal stresses and thermal expansions of the mould segment halves is controlled better. A cooling apparatus is preferably provided which has a cooling circuit and docking means for the releasable docking of the cooling circuit to coolant passages formed in the mould segment halves. Coolant passages are therefore formed directly in the mould segment halves and coolant flows through them. The mould segment halves located on the mould path can be connected to the cooling apparatus by means of the docking means. Coolant can be circulated through the mould segment halves on the mould path.

The cooling apparatus advantageously has flexibly made coolant hose which can be coupled to the mould segment halves such that the coolant hose are taken along over a stretch with the mould segment halves and coolant can be circulated through the mould segment halves during the mould segment half movement on the mould path.

In a further development of the invention, leak-free couplings are provided for the connection of the machine side cooling device to the mould segment halves and open on docking and automatically close both the coolant passages on the mould segment half side and the coolant lines on the machine table side without leaks on docking release. In this way, it is prevented, on the one hand, that coolant contamination occurs. On the other hand, it is made possible that the coolant can remain in the mould segment halves after the docking release of the cooling apparatus on the machine table side in order to further draw heat from these while the mould segment halves are on the return conveying path. As soon as the mould segment halves come back onto the mould path, the cooling apparatus is docked again and the coolant exchanged.

The mould segment halves can advantageously have expansion stores into which coolant located in coolant passages on the mould segment half side can expand, in particular after the cooling apparatus and thus the circulating circuit is released from docking.

In a further development of the invention, the cooling apparatus can simultaneously be used as a heating apparatus to pre-heat the mould segment halves. In this way, the start-up time is substantially shortened and the rejects incurred on the starting up of the machine are considerably reduced.

In a further development of the invention, a parking station for special mould segment halves such as spigot mould segment halves and the like can be provided at the end of the mould path. The corresponding special mould segment halves can be parked there and only fed into the machine cycle by the return conveyor when this is desired. When the special mould segment halves are fed in, the corresponding mould segment half not used is parked at the parking station. The exchange can be effected particularly easily since the parking station is provided directly at the machine table at the end of the mould path so that this can take place simply in the normal cycle of the return conveyor.

Furthermore, a change station can be provided at the end of the mould path for the feeding in of new mould segment halves into or out of the mould segment half circuit during the conversion of the machine. The change station is preferably formed separately from the machine table. The change station can in particular have a travellable change table which can be travelled into and out of the operating region of the return conveyor, preferably to the end of the machine table of the mould path device remote from the injection head. For this purpose, rails can be provided in the base plate transversely to the direction of the mould path in the region of its end and the change table can be travelled on these rails. The mould segment halves to be changed can be transversely moved out of the plant by means of the machine table and new mould segment halves can be travelled back in again. The return conveyor takes the mould segment halves from the travelled-in change table and feeds them onto the machine table at the front end of the mould path.

BACKGROUND OF THE INVENTION

The invention will be described in the following with reference to a preferred embodiment and associated drawings. There are shown in the drawings.

DESCRIPTION OF THE PREFERRED EMBODIMENTS

Figure 1:
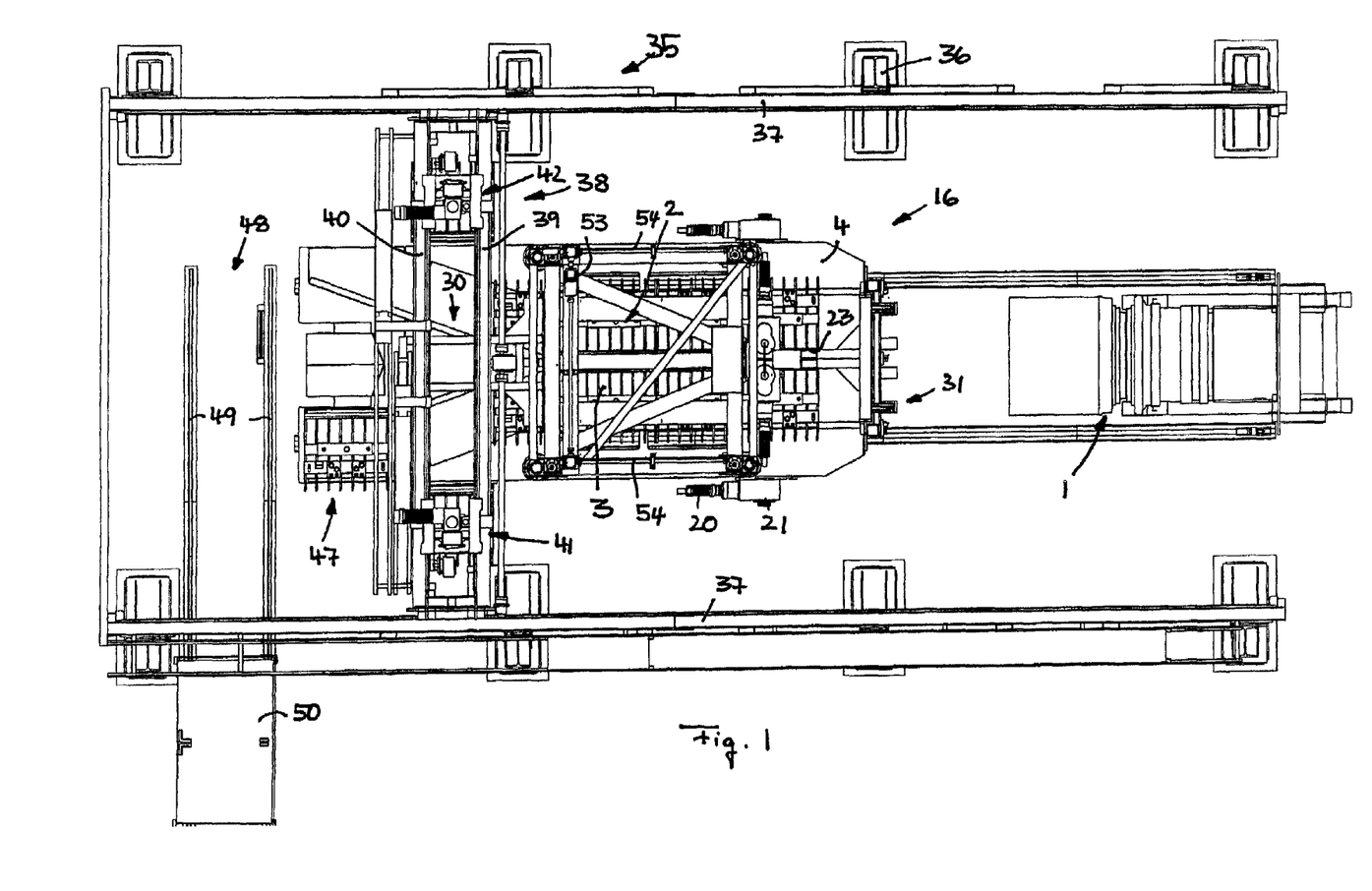
FIG. 1 a plan view of a corrugated pipe plant in accordance with a preferred embodiment of the present invention which shows a polar robot fixedly installed to the floor and a mould path device with machine table which can be travelled on rails and structures secured thereto.

FIG. 1 shows the mould path 2 downstream of an injection head 1, with a plastic hose coming out of the injection head 1 being transversely profiled along said mould path 2. For this purpose, mould segment halves which complement one another are guided in pairs along the mould path 2 on the machine table 4.

The machine table 4 has an undercarriage 5 with which the machine table 4 can be travelled on rails 7 anchored in a base plate 6. As FIG. 1 shows, the machine table 4 can be travelled in the operating direction of the injection head 1. A travel drive for the machine table 4 can generally be made in different manners. In accordance with an advantageous embodiment, this can be a ball spindle drive. In FIG. 1, the machine table 4 is shown in its position travelled away from the injection head 1. During the operation, the machine table 4 is travelled to the right in accordance with FIG. 1 so that the mould segment halves 3 located on the machine table 4 are travelled in to the injection head 1.

Figure 2:
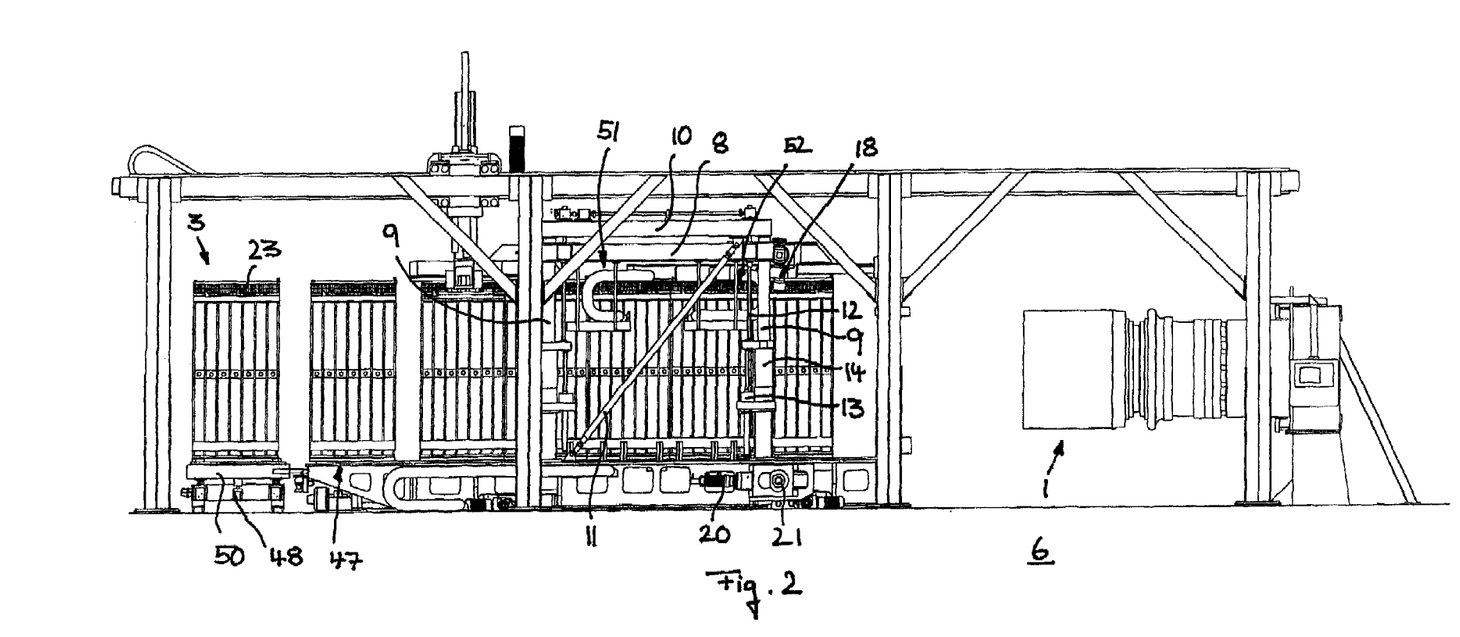
FIG. 2 a side view of the corrugated pipe plant of FIG. 1, wherein the mobile mould path device is moved away from an injection head.

A cover frame 8 is arranged above the machine table 4. As FIGS. 1 and 2 show, four columns 9 are anchored on the machine table 4 and the cover frame 8 is displaceably mounted on these. The columns 9 are connected to one another at their upper ends by a yoke 10. The yoke 10 is rigidly secured to the columns 9. In addition, the yoke 10 is anchored to the machine table 4 by means of two transversely extending tension anchors 11 arranged at the side in order to absorb forces which are exerted by the upper drive means, which will be explained later, arranged at the cover frame 8. In this way, torsion of the columns 9 is avoided.

As FIG. 2 shows, the cover frame 8 is slidingly displaceably mounted at the columns 9. It is supported and vertically adjustable by means of four elevating screws 12 which are each arranged at the columns 9. The associated lift drive 53 is arranged on the upper side of the yoke 10 and connected via suitable transmissions on the elevating screws. The drive movement of the lift drive 53 is synchronously transmitted to all elevating screws by means of connection shafts 54 (cf. FIG. 1). Accordingly, the cover frame can be travelled up and down relative to the columns 9 and relative to the yoke 10, as is particularly illustrated by FIG. 4.

Figure 4:
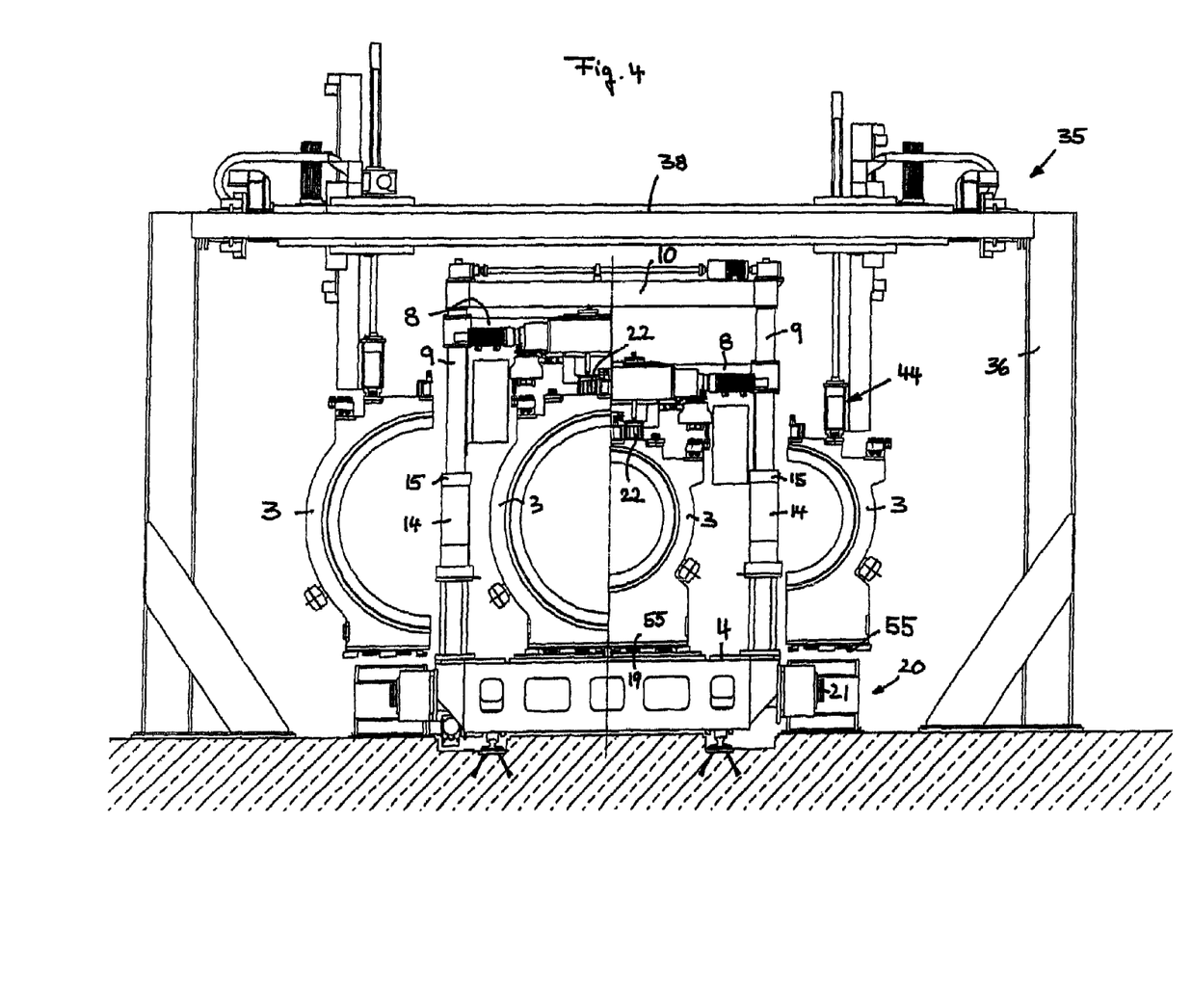
FIG. 4 a front view of the corrugated pipe plant similar to FIG. 3, wherein the plant is illustrated in two configurations comprising different mould segment half sizes.

In addition, the cover frame 8 can be lowered into a transport position to the machine table 4 together with the yoke 10 and the structures arranged thereon. As FIG. 2 shows, the columns 9 are formed in telescopable manner. Each of the columns 9 can be telescoped together by means of telescope drives 13 in the form of elevating screws. As FIG. 4 shows, support sleeves 14 are placed around an extended part of the columns 9 in the extended work position of the columns 9. The extended columns 9 can be extended onto the support sleeves 14 with a step-shaped shoulder 15, which simultaneously serves the linking of the elevating screws so that a precise and defined position of the columns is achieved in the extended state. After removal of the support sleeves 14, the upper part of the columns 9 can be lowered until the step-shaped shoulders 15 sit on the lower cylinders of the columns 9. With this additional lowering into a transport position, the overall height of the mould path direction, which is designated by 16 in total, can be considerably reduced. The yoke 10 rigidly secured to the columns 9 with the structures located thereon is also lowered accordingly. This considerably facilitates the transport of the mould path device 16. Before a lowering of the yoke 10, the tension anchors 11 secured thereto must be released.

To advance the mould segment halves 3 on the machine table 4, a main drive is provided which comprises lower drive means 17, which are integrated in the machine table, and upper drive means 18, which are mounted at the cover frame 8. As FIG. 4 shows, the lower drive means 17 have four driving pinions 19 which can be driven around respective horizontal axes transverse to the longitudinal direction of the mould path 2. The lower driving pinions 19 are put together in pairs and are driven by drives 20 arranged at the side at the machine table 4. The drives 20 are each coupled to a drive shaft via a transmission stage 21 and the driving pinions 19 sit or are formed on them. The drives 20 can preferably be dismantled from the machine table 4 in order to reduce its overall width during transport.

As FIG. 4 shows, the mould segment halves 2 to be driven on the machine table 4 each have two racks 55 at their lower side into which the lower driving pinions 19 can engage.

Figure 3:
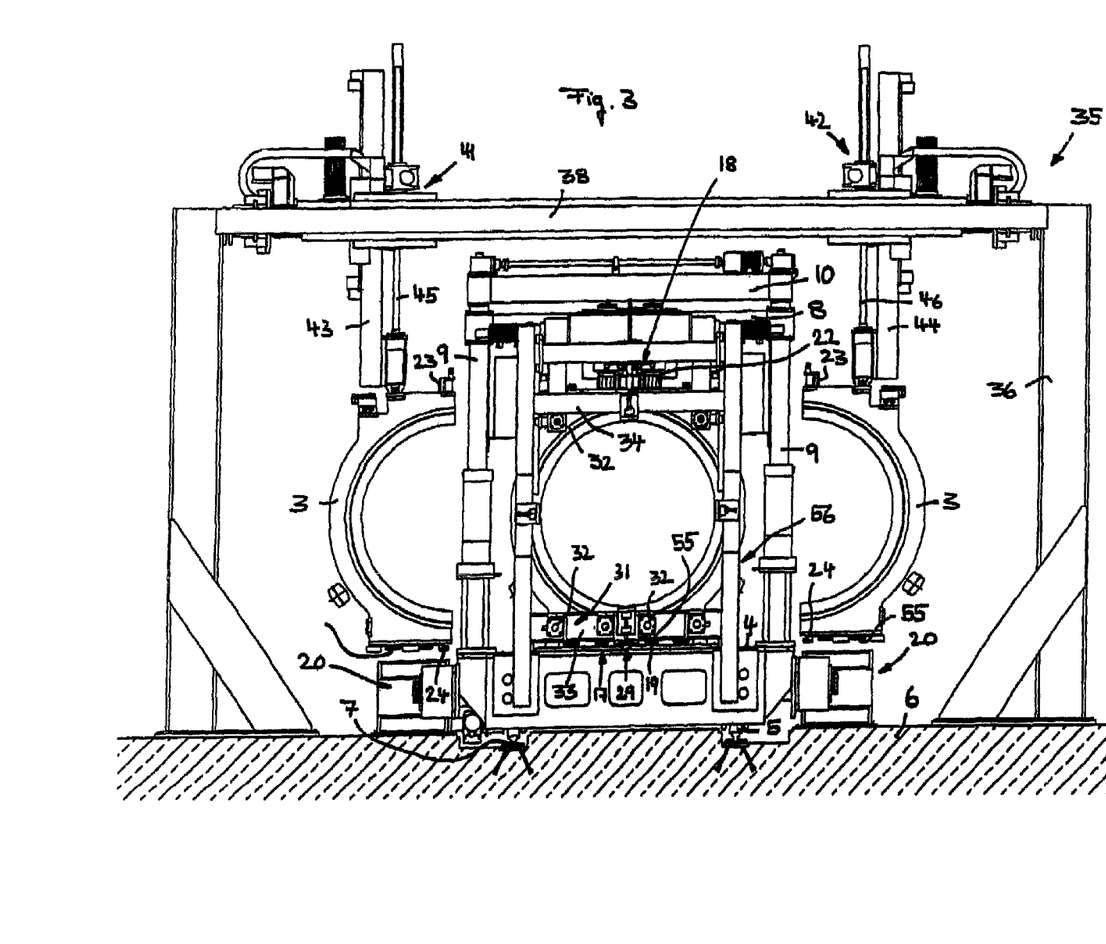
FIG. 3 a front view of the mould path device and of the portal robot bridging this from the side of the spray head.

As FIG. 3 shows, the lower drive means 17, like the upper drive means 18, sit in the half of the machine table 4 which faces the injection head 1, but which extends beyond the driving pinions towards the injection head so that returned mould segment halves can be set down on the machine table before the driving pinions in order then to be pushed onto the driving pinions 19 by separate drive means, as will be explained later.

The upper drive means 18 at the cover frame 8 comprise a pair of mutually spaced upper driving pinions 22 which can be driven around vertical axes of rotation (cf. FIG. 4). The upper driving pinions 22 can be driven via corresponding drives and optionally transmission stages.

The mould segment halves 3 have racks 23 which are mounted at their upper sides and which are tilted into an upright arrangement so that their end side is facing the periphery of the driving pinions 22. As FIG. 3 shows, the racks 23 are oriented towards the outside at the upper side of the mould segment halves 3 so that they run between the two driving pinions 22 with mould segment halves 3 which complement one another in pairs. The forces exerted by the driving pinions 22 thus act in a closing manner on the mould segment halves 3. The specific arrangement of the upper drive means 18 has the big advantage that thermal expansion of the mould segment halves are permitted and not harmful for the drive. A certain offset can occur between the racks 23 and the upper driving pinions 22 in the vertical direction without this hindering the feed of the mould segment halves 3.

To guide the mould segment halves along the mould path 2, on the one hand, a guide rail 29 is provided on the machine table 4 which can preferably have a T-shaped section. The mould segment halves 3 have undercut guide projections 24 at their lower side with which they can engage under the guide rail 29 on the machine table 4. In this way, an additional security is reached. Furthermore, additional guide rolls can be provided at the machine table.

A longitudinal guide is also provided at the upper side of the mould segment halves 3. Guide rolls and an associated guide rail can in particular be provided at the cover frame 8 and at the upper side of the mould segment halves 3.

The guides at the machine table 4 and at the cover frame 8 fork in a V-shaped manner towards the end of the mould path so that the mould segment halves are pressed apart at the end of the mould path and raised from the corrugated pipe. The V-shaped forking 30 of the guides on the machine table 4 are shown in FIG. 1.

Auxiliary advance means 31 are provided at the front end of the machine table 4 facing the injection head 1 and form a feed device for returned mould segment halves 3. The returned mould segment halves 3 are set down on the machine table 4 at the front end of this so that they are not yet in engagement with the driving pinions 19 or 22 respectively. As FIGS. 1 and 3 show, pneumatic cylinders 32 are provided whose operating direction is disposed parallel to the mould path 2. The pneumatic cylinders 32 are arranged at the end frame 56 connected to the machine table 4. As FIG. 3 shows, four pneumatic cylinders 32 are arranged at a cross member 33 of the end frame which is arranged at the front end of the machine table 4 just above its surface. Two further pneumatic cylinders 32 are arranged at an upper cross member 34 of the end frame 56. When the pneumatic cylinders 32 are actuated, a mould segment half pair 3 set down on the front end of the machine table 4 can be shot onto a preceding mould segment half already located on the mould path 2. For this purpose, the pneumatic cylinders 32 push the mould segment half pair to be closed up towards the preceding mould segment half. The pneumatic cylinders 32 have an absorbing effect during the closing up and reduce a possible impact between the pushed up and the preceding mould segment half pairs.

To return the mould segment halves 3 located at the end of the mould path 2 to the start of the mould path 2, a portal robot 35 is provided which is fixedly anchored to the base plate 6 and spans the mould path 2 or the mould path device 16. A plurality of supports 36 are anchored in the base plate 6 at both sides of the mould path 2 in each case along a straight line parallel to the mould path 2. At the upper ends of the supports 36 there sit two elongate carriers 37 parallel to the mould path 2 and a portal 38 which spans the mould path 2 is mounted in a travellable manner on these. The portal 38 is made in a planar manner. As FIG. 1 shows, the portal 38 consists of two cross members 39 and 40. The portal 38 is mounted and travellable in a manner known per se along the elongate carriers 37.

Two side carriages 41, 42, which can be travelled in opposite directions on the portal 38, sit on the portal 38. The side carriages 41 and 42 can each be formed double so that they sit on the cross members 39 and 40. One carriage drive 57, 58 to travel the carriage is associated with each of the side carriages 41 and 42.

A gripping arm 43, 44, which is mounted in a vertically adjustable manner at the respective side carriage, sits on each of the side carriages 41 and 42. A lift drive 45 and 46 is associated with each of the gripping arms 43 and 44 so that the gripping arms 43 and 44 can be raised and lowered perpendicularly independent of the position of the carriage. At the end of the gripping arms 43 and 44, gripping devices are provided which preferably work in form-locking manner and with whose aid mould segment halves 3 can be gripped at their upper sides, in particular at corresponding bolt heads.

The portal robot 35 grips a pair of mould segment halves 3 travelled apart at the end of the mould path 2 by means of the gripping arms 43 and 44. This preferably takes place during the moving apart movement of the mould segment halves 3 at the forking 30. A two-axis synchronisation takes place for the gripping of the mould segment halves by the portal robot. The movement of the gripping arms 43 and 44 are synchronised both in the x direction and in the y direction for the movement of the mould segment halves. The gripping arms of the portal robot therefore move in this connection exactly corresponding to the movement of the mould segment halves along the fork 30. To compensate for position inaccuracies of the mould segment halves, for example as a consequence of thermal expansion, sensors are advantageously provided at the gripping arms 43 and 44 which precisely determine the relative position of the gripping devices at the gripping arms with respect to the mould segment halves, in particular to their bolt heads, in particular in the final section of the approximation of the gripping devices to the mould segment halves. The control device connected to the sensors can instigate corresponding corrections of the movement of the gripping arms and compensate position inaccuracies of the mould segment halves as a consequence of thermal expansion and the like.

The mould segment halves 3 are lifted by the portal robot 35 from the machine table 4, moved past the machine table 4 at the side back to the start of the mould path and again set down on the machine table 4 at the end of this at the injection head side. Once set down on the machine table, the mould segment halves 3 are pushed by the pneumatic cylinders 32 onto the preceding mould segment pair and brought into engagement with the driving pinions 19 and 22.

As FIG. 1 and FIG. 2 show, the machine table 4 is extended to the rear beyond the mould segment half removal region in which the portal robot 35 engages the mould segment halves 3 at the end of the mould path. It forms a parking station 47 at its end remote from the injection head 1 for special mould segment halves such as spigot mould segment halves, etc., which only have to be fed into the mould segment half circuit at a given time. To feed in the mould segment half pair parked at the parking station 47, the portal robot 35 grips this and sets it down at the front end of the machine table 4. The mould segment half pair meanwhile pushed out at the end of the mould path 2 on the machine table simply travels further apart along the forking guide 30 and is finally placed down in the parking station 47 by the portal robot. The parking station is advantageously disposed directly on the machine table 4. The portal robot then simply grips the next mould segment half pair 3 in order to convey this back to the end of the machine table at the injection head side and to set it down there. The slipping in and out of special mould segment halves is considerably facilitated by the arrangement of the parking station on the machine table 4. The portal robot 35 takes care of the slipping in and out.

As FIG. 1 shows, a changing station 48 is provided at the rear end of the plant remote from the injection head 1. Transversely extending rails 49, on which a changing table 50 can be travelled in and out, are anchored in the base plate 6. In its position travelled into the working range of the portal robot 35, the changing table 50 lies approximately at the end of the travel region of the machine table 4 when this is travelled away from the injection head 1. New mould segment halves can be travelled in to convert the machine with the aid of the changing table 50. The portal robot 35 takes up respectively travelled in mould segment halves from the changing table 50 so as to put them down on the machine table 4 at the end of this remote from the injection head 1. To expel the old mould segment halves, the portal robot 35 takes mould segment halves located at the end of the mould path 2 and puts them down on the empty changing table 50. The changing table 50 is preferably made so large that at least one pair of mould segment halves can be placed on it.

The interplay between the machine table 4 or the total mould path device 16 and the portal robot 35 separate therefrom is controlled by a central control device. In order to know in which arrangement the mould path device 16 and the portal robot 35 are relative to one another, a position detection device is provided. The machine table 4 can preferably be travelled along the rails 7 anchored in the base by means of a ball spindle. An absolute value transponder is associated with the ball spindle or its drive and always accurately indicates the position of the machine table 4. Furthermore, the position device has an absolute value transponder which is associated with the drive of the portal 38. The control device can always exactly determine the relative position of the mould path device and of the portal robot relative to one another from this. In particular, the control device can control the portal robot 35 such that this grips the mould segment halves 3 during their movement on the machine table 4. The return of the mould segment halves 3 therefore takes place without any interruption to the process.

As FIG. 2 shows, a cooling apparatus 51 or its docking means 52 is mounted at the upper cover frame 8. The cooling apparatus 51 has leak-free couplings which allow a coupling of the mould segment halves 3 located on the mould path 2 to the cooling apparatus 51. In the mould segment halves 3 themselves, coolant passages are formed such that a direct cooling of the mould segment halves 3 is possible.

The cooling apparatus 51 or their connections on the mould segment half side travel along a part of the path distance with the mould segment halves 3 on their movement along the mould path 2 on the machine table 4 so that coolant can circulate through the mould segment halves 3 during the movement on the mould path 2. At the end of the mould path 2, the leak-free couplings of the cooling apparatus 51 uncouple. The coolant remains in the mould segment halves 3.

The invention claimed is:

1. An apparatus for the manufacture of corrugated pipes from thermoplastic in which mold segment halves (3), which complement one another in pairs, are guided together along a mold path (2) adjacent to an injection head (1), moved apart at an end of the mold path (2) and returned back to start separately from one another, comprising a mold path device (16) structured and arranged to move the mold segment halves (3) along the mold path (2) and a return conveyor (35) structured and arranged to return the mold segment halves (3) from an end of the mold path (2) back to the start, with the mold path device (16) comprising a machine table (4) having a lower guide (29) and lower drive means (17) for the mold segment halves (3) and a cover frame (8) secured to the machine table (4) having an upper guide and upper drive means (18) for the mold segment halves (3), wherein the upper drive means (18) are driving pinions (22) running around vertical axes perpendicular to the machine table (4) so that they allow displacement of the mold segment halves (3) perpendicular to the machine table (4).

2. An apparatus according to claim 1, wherein the driving pinions (22) cooperate with racks (23) provided at the mold segment halves (3).

3. An apparatus for the manufacture of corrugated pipes from thermoplastic in which mold segment halves (3), which complement one another in pairs, are guided together along a mold path (2) adjacent to an injection head (1), moved apart at an end of the mold path (2) and returned back to start separately from one another, comprising a mold path device (16) structured and arranged to move the mold segment halves (3) along the mold path (2) and a return conveyor (35) structured and arranged to return the mold segment halves (3) from the end of the mold path (2) back to the start, with the mold path device (16) comprising a machine table (4) having a lower guide (29) and lower drive means (17) for the mold segment halves (3), wherein a cover frame (8) is mounted in a vertically adjustable manner relative to the machine table (4) and can be adjusted by a lift drive (12).

4. An apparatus according to claim 3, wherein the cover frame (8) is made lowerable towards the machine table (4) into a transport position and supported by columns (9) secured to the machine table (4) and able to be telescoped by a motor.

5. An apparatus for the manufacture of corrugated pipes from thermoplastic in which mold segment halves (3), which complement one another in pairs, are guided together along a mold path (2) adjacent to an injection head (1), moved apart at an end of the mold path (2) and returned back to start separately from one another, comprising a mold path device (16) structured and arranged to move the mold segment halves (3) along the mold path (2) and a return conveyor (35) structured and arranged to return the mold segment halves (3) from the end of the mold path (2) back to the start, with the mold path device (16) comprising a machine table (4) having a lower guide (29) and lower drive means (17) for the mold segment halves (3), wherein a cooling apparatus (51) is provided to cool the mold segment halves (3) and has a cooling circuit and docking means for releasable docking of the coolant circuit to coolant passages made in the mold segment halves (3), the cooling apparatus (51) has movably designed coolant lines, such that the docked coolant lines can be moved along with the moved mold segment halves (3) over a path, and coolant passages on the mold segment half side and coolant lines on the machine table side are provided with leak-free couplings which are structured and arranged to open automatically on docking and, on undocking, automatically close the coolant passages on the mold segment half side and the coolant lines on the machine table side without leaks.

6. An apparatus according to claim 5, wherein the mold segment halves (3) have expansion stores into which coolant located in the coolant passages on the mold segment half side can expand.

7. An apparatus for the manufacture of corrugated pipes from thermoplastic in which mold segment halves (3), which complement one another in pairs, are guided together along a mold path (2) adjacent to an injection head (1), moved apart at an end of the mold path (2) and returned back to start separately from one another, comprising a mold path device (16) structured and arranged to move the mold segment halves (3) along the mold path (2) and a return conveyor (35) structured and arranged to return the mold segment halves (3) from the end of the mold path (2) back to the start, with the mold path device (16) comprising a machine table (4) having a lower guide (29) and lower drive means (17) for the mold segment halves (3), wherein a cooling apparatus (51) is provided to cool the mold segment halves (3) and has a cooling circuit and docking means for releasable docking of the coolant circuit to coolant passages made in the mold segment halves (3), and the cooling apparatus (51) further comprises a heater for heating the coolant so that the cooling apparatus (51) is structured and arranged to preheat the mold segment halves (3) during the starting up of the apparatus.

\* \* \* \* \*